US010584736B2

(12) United States Patent
Ormsbee et al.

(10) Patent No.: US 10,584,736 B2
(45) Date of Patent: Mar. 10, 2020

(54) SYSTEMS AND METHODS FOR A 360 DEGREE ROTATING AND DETACHABLE DOUBLE CARABINER

(71) Applicant: NITE IZE, INC., Boulder, CO (US)

(72) Inventors: Bowden Ormsbee, Longmont, CO (US); Rex W. Stevens, Longmont, CO (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 16/035,017

(22) Filed: Jul. 13, 2018

(65) Prior Publication Data
US 2019/0017535 A1    Jan. 17, 2019

Related U.S. Application Data

(60) Provisional application No. 62/532,901, filed on Jul. 14, 2017.

(51) Int. Cl.
F16B 45/02 (2006.01)
F16B 1/00 (2006.01)

(52) U.S. Cl.
CPC ............. F16B 45/02 (2013.01); F16B 1/00 (2013.01); F16B 2001/0035 (2013.01); Y10T 24/32 (2015.01); Y10T 24/3485 (2015.01)

(58) Field of Classification Search
CPC . Y10T 24/3485; Y10T 24/3493; Y10T 24/32; F16B 45/06; F16B 45/02; F16B 2001/0035; A63B 29/02
See application file for complete search history.

(56) References Cited

U.S. PATENT DOCUMENTS

| 3,041,697 | A | | 7/1962 | Budreck | |
|---|---|---|---|---|---|
| 3,516,697 | A | | 7/1970 | Hahn | |
| 4,274,252 | A | | 6/1981 | Cavender | |
| 5,092,019 | A | * | 3/1992 | Levy | A44C 5/208 24/303 |
| D337,935 | S | | 8/1993 | Hawley | |
| 6,848,288 | B1 | * | 2/2005 | Derman | A44B 15/002 24/303 |
| D649,018 | S | | 11/2011 | Kope | |
| 8,172,476 | B2 | | 5/2012 | Berney | |
| D686,058 | S | | 7/2013 | Paik | |
| D698,626 | S | | 2/2014 | Ormsbee et al. | |
| 9,032,594 | B1 | * | 5/2015 | Mitchell | F16B 45/02 24/303 |
| 9,080,595 | B1 | * | 7/2015 | Mitchell | F16B 45/04 |
| 9,255,602 | B2 | | 2/2016 | Liang | |
| D753,986 | S | | 4/2016 | Petzl | |
| 9,441,665 | B2 | * | 9/2016 | Liang | F16B 45/02 |
| D769,104 | S | | 10/2016 | Reid | |
| 2006/0107499 | A1 | | 5/2006 | Wu | |

(Continued)

Primary Examiner — Robert Sandy
Assistant Examiner — Michael S Lee
(74) Attorney, Agent, or Firm — Haynes and Boone, LLP

(57) ABSTRACT

A carabiner apparatus includes a first carabiner portion and a second carabiner portion. The carabiner apparatus further includes a first piece of magnetic material attached to the first carabiner portion. The carabiner apparatus further includes a second piece of magnetic material attached to the second carabiner portion, the first piece and second piece of magnetic material attracted to each other and releasably holding the first carabiner portion and the second carabiner portion together at an angle.

21 Claims, 10 Drawing Sheets

(56) References Cited

U.S. PATENT DOCUMENTS

| | | | |
|---|---|---|---|
| 2007/0052234 A1 | 3/2007 | Breay | |
| 2008/0250615 A1* | 10/2008 | Emenheiser | F16B 45/02 24/599.5 |
| 2009/0000086 A1* | 1/2009 | Bing | F16B 45/06 24/592.11 |
| 2010/0024175 A1* | 2/2010 | Cserpes | A45F 5/04 24/303 |
| 2012/0060332 A1* | 3/2012 | Mitchell | F16B 45/02 24/592.1 |
| 2012/0297590 A1* | 11/2012 | Spataro | F16B 45/02 24/599.9 |
| 2012/0297890 A1* | 11/2012 | Dang | G01L 5/101 73/828 |
| 2013/0185901 A1* | 7/2013 | Heyman | A01K 27/005 24/303 |
| 2014/0115840 A1 | 5/2014 | Liang et al. | |
| 2014/0317892 A1* | 10/2014 | Yoo | F16B 45/00 24/346 |
| 2015/0047154 A1* | 2/2015 | DeBien | F16B 45/02 24/303 |
| 2016/0166018 A1* | 6/2016 | Morinville | A44C 5/209 63/3.1 |
| 2017/0231334 A1* | 8/2017 | Morinville | A44C 5/2038 63/3.1 |
| 2018/0255882 A1* | 9/2018 | Liggett | A44B 13/02 |

* cited by examiner

FIG. 8
FIG. 9
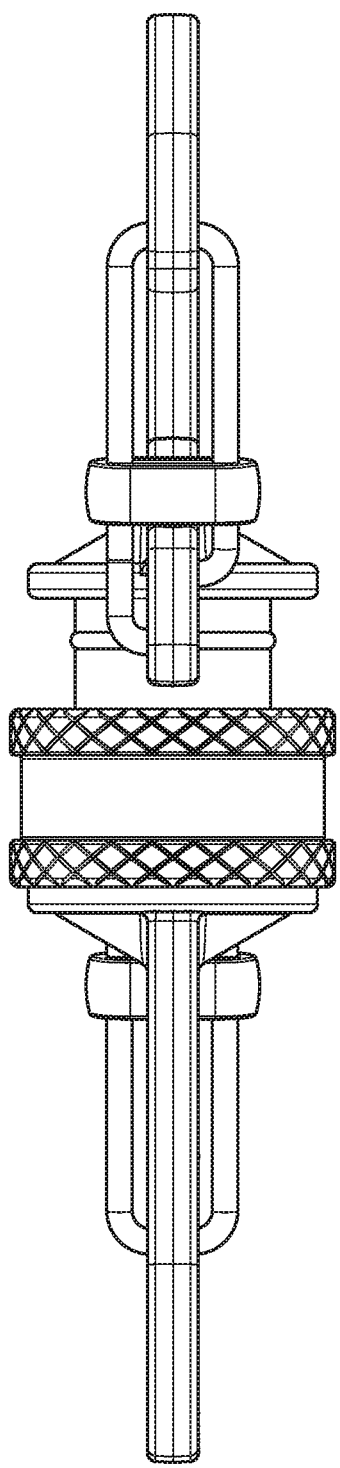
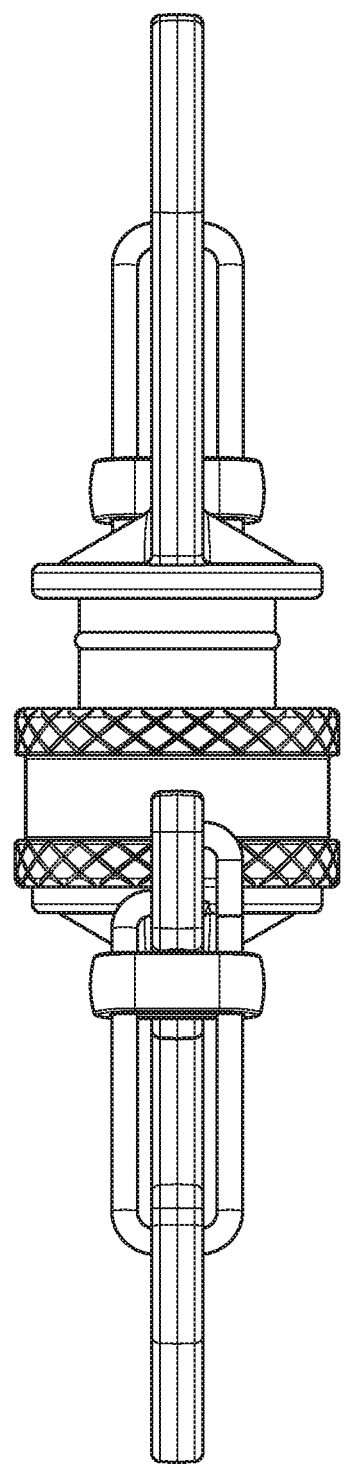

SYSTEMS AND METHODS FOR A 360 DEGREE ROTATING AND DETACHABLE DOUBLE CARABINER

CROSS REFERENCE TO RELATED APPLICATION

This application claims the benefit of U.S. Provisional Patent Application No. 62/532,901 filed Jul. 14, 2017, and hereby incorporated by reference to the same extent as though fully disclosed herein.

BACKGROUND

In various scenarios, connectors are useful for hikers, fisherman, outdoorsmen, travelers, and a variety of other users. Carabiners may be used to tie objects down, connect one object to another, and find a very wide variety of uses. A double carabiner such as an S shaped carabiner are useful, however, somewhat limited since the gate portion of the carabiner only faces one way.

SUMMARY

In one embodiment, a carabiner apparatus includes a first carabiner portion and a second carabiner portion. The carabiner apparatus further includes a first piece of magnetic material attached to the first carabiner portion. The carabiner apparatus further includes a second piece of magnetic material attached to the second carabiner portion, the first piece and second piece of magnetic material attracted to each other and releasably holding the first carabiner portion and the second carabiner portion together at an angle. Optionally, a sleeve, the sleeve attached to the first carabiner portion and attachable to the second carabiner portion. In one alternative, the carabiner apparatus further includes comprising a flange, the flange attached to the first carabiner portion, the sleeve surrounding the flange, the sleeve rotatable around the flange. In another alternative, the flange includes a lip, the lip presenting the sleeve from advancing off an end of the flange, the end of the flange projecting away from the first carabiner portion. Alternatively, an inner portion of the sleeve is threaded and a corresponding outer portion of the second carabiner portion is complementarily threaded such that sleeve is screwable onto the second carabiner portion, attaching the first carabiner portion and the second carabiner portion. Optionally, the carabiner apparatus further includes a screw, the screw attaching the flange to the first carabiner portion. In one alternative, the first piece of magnetic material is attached to the first carabiner portion via the flange and the first piece of magnetic material is attached to the flange. Alternatively, the first and second carabiner portion are rotatable in relation to each other when the sleeve is screwed onto the second carabiner portion without unscrewing the sleeve. In one configuration, the first and second carabiner portion each include a lockable carabiner. Optionally, the first and second carabiner portion include a lockable carabiner. Alternatively, the carabiner apparatus further includes an o-ring, the o-ring located on the second carabiner portion such that when the sleeve is screwed onto the second carabiner portion the o-ring is compressed, locking the sleeve in place. Alternatively, one of the first and second piece of magnetic material is a permanent magnet. Optionally, the lockable carabiner includes a gate with a slide on the gate, such that when the slide is positioned in a slot on the lockable carabiner, the gate is prevented from opening.

In one embodiment, a double carabiner includes a first and second carabiner, a base of the first carabiner attachable to a base of the second carabiner. The double carabiner further includes a first magnetic material located in the base of the first carabiner and a second magnetic material located in the base of the second carabiner, the first and second magnetic material holding the first and second carabiner together. In one alternative, the first and second carabiner are attachable via a sleeve, the sleeve connected to the base of the first carabiner and attachable to the base of the second carabiner. In another alternative, the sleeve is connectable to the base of the second carabiner via a threading in the base of second carabiner and a threading in the sleeve. Optionally, the first and second carabiners are rotatable in relation to each other when the sleeve is screwed to the second carabiner. Alternatively, the first and second magnetic material hold the first and second carabiner is a rotational position. Optionally, one of the first and second magnetic material is a permanent magnet. Alternatively, the first and second carabiner are locking carabiners.

BRIEF DESCRIPTION OF THE DRAWINGS

FIG. 8 shows a front view of the 360 degree double carabiner of FIG. 1;

FIG. 9 shows a rear view of the 360 degree double carabiner of FIG. 1;

DETAILED DESCRIPTION

Certain terminology is used herein for convenience only and is not to be taken as a limitation on the embodiments of the systems and methods for a 360 degree rotating and detachable double carabiner ("360 degree double carabiner"). Generally, embodiments of 360 degree double carabiners include two carabiner portions. In many embodiments, each of the carabiners has a locking feature. Additionally, the 360 degree double carabiner includes a magnetic portion that holds the carabiners in a fixed rotational position. Additionally, the 360 degree double carabiner includes a locking sleeve that locks one of the carabiners to the other carabiner. In this way, the carabiners can be held in a fixed rotational position to make it easy to detach and attach items to the carabiners. Additionally, one carabiner may be attached and locked to one item and the other carabiner may be attached and locked to another item. Then the locking sleeve may be used to attach and detach the two items to each other. Multiple other uses are possible as well. Other features of embodiments of the device are discussed herein.

Figure 1:
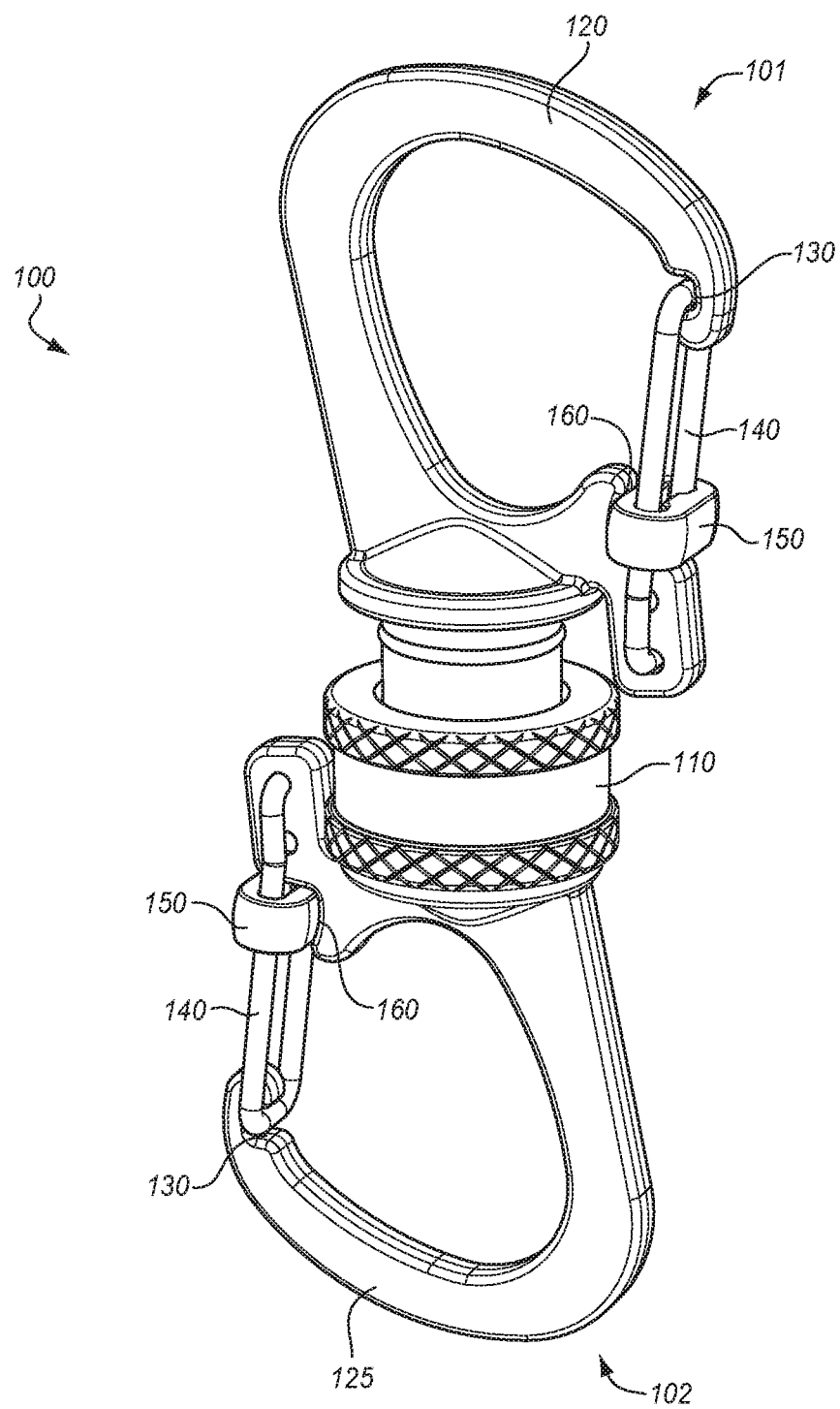
FIG. 1 shows one embodiment of a 360 degree double carabiner.

FIG. 1 shows one embodiment of a 360 degree double carabiner 100. 360 degree double carabiner 100 includes a first carabiner portion 101 and a second carabiner portion 102. The first and second carabiner portions 101, 102 are attached to each other via a locking sleeve 110. The first and second carabiner portions 101, 102 generally include a hook portion 120, 125. Each hook portion 120, 125 includes a groove 130 for receiving a gate 140. The shape of the hook portions 120, 125 is purely exemplary and other shapes may be utilized. Each gate 140 includes a sliding lock 150 that is shaped to slide up and down gate 140. Each carabiner portion 101, 102 includes a slot 160, into which sliding lock 150 may be slid. When the sliding lock 150 is positioned in the slot 160, the slot 160 and sliding lock 150 interface to prevent the gate 140 from rotating. When the sliding lock 150 is slid up the gate 140, the gate 140 may rotate and open. The locking portion and gate design shown in the present application is just one possible design. In alternative embodiments, a different gate design may be used. Additionally, a locking feature may or may not be included in the design and different locking features than the ones shown may be included.

Figure 2:
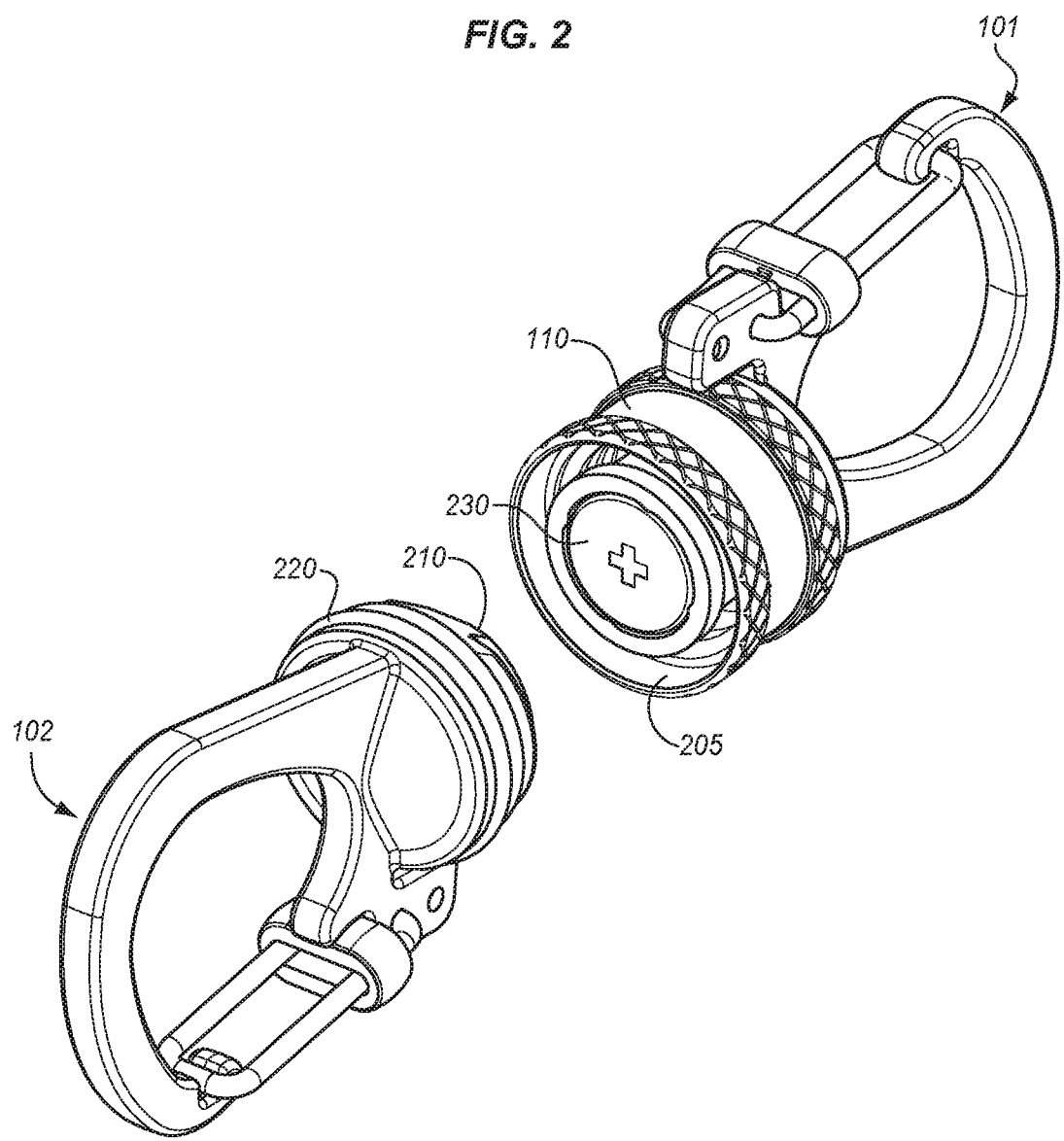
FIG. 2 shows the 360 degree double carabiner of FIG. 1 in a separated configuration.

FIG. 2 shows 360 degree double carabiner 100 in a separated configuration. In this view, locking sleeve 110 has been unscrewed and retracted. Locking sleeve 110 includes an inner threaded portion 205 that may screw and unscrew from threaded portion 210. At the end of threaded portion 210 is a rubberized o-ring 220 that compressed when the locking sleeve 110 is screwed into place. Also visible in this view is magnet 230 that attaches to a reciprocal magnetic portion in order to allow the carabiner portions 101, 102 to be positioned in a variety of positions.

Figure 3:
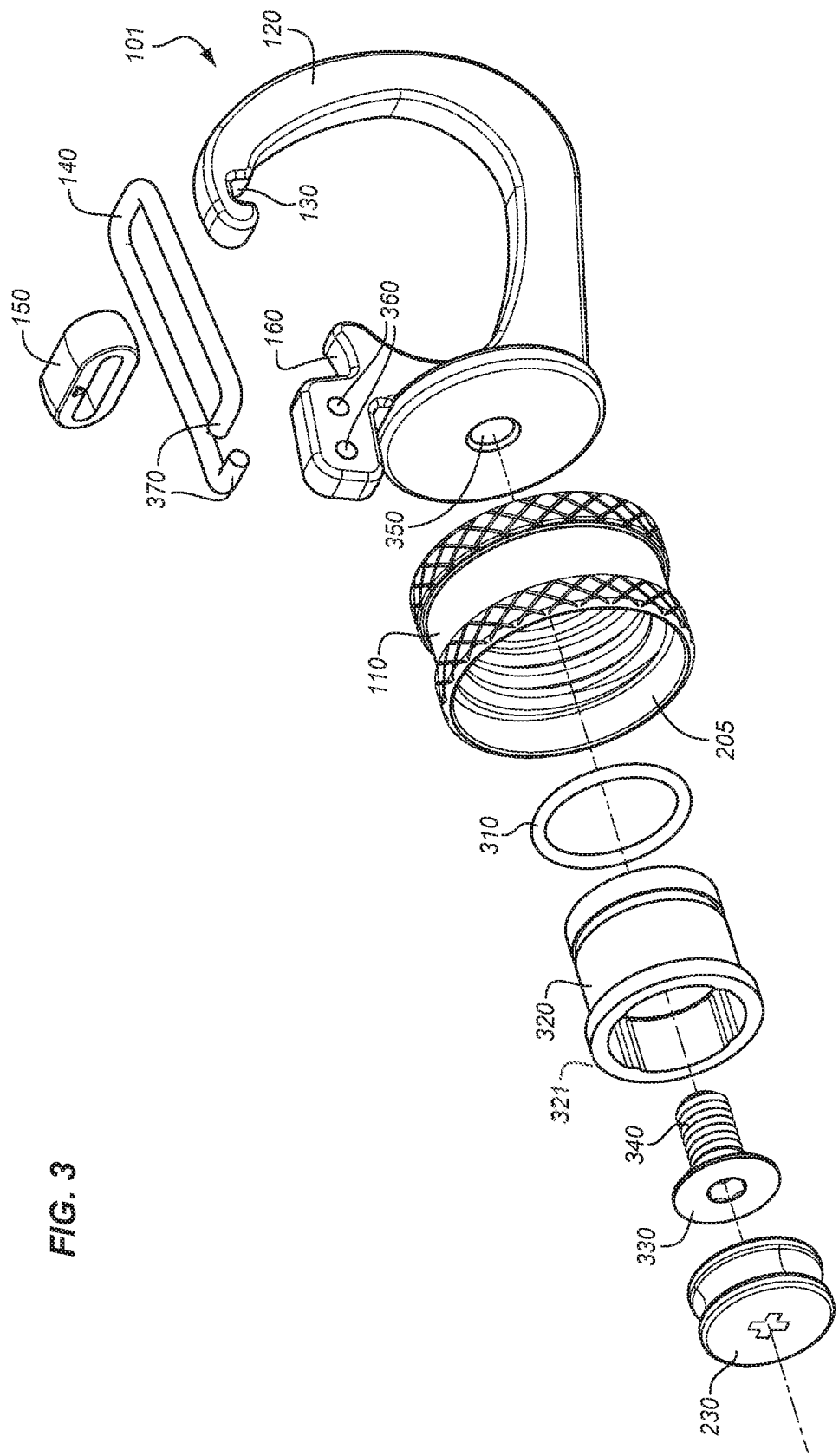
FIG. 3 shows an exploded view of one side of the carabiner portion of the 360 degree double carabiner of FIG. 1.

FIG. 3 shows an exploded view of carabiner portion 101. Various parts are visible in this view. Inside of sleeve 110, flange cap 320 and o-ring 310 are arranged such that sleeve 110 may slide up and down flange cap 320. Flange cap 320 is held to hook portion 120 via screw 330 having threading 340 that interfaces with threaded receiver 350. This arrangement provides for the rotation of locking sleeve around flange cap 320, such that even when locking sleeve 110 is screwed onto threaded receiver 210, the two carabiners may rotate in relation to each other. Magnet 230 (or alternatively a magnetic material that is capable of magnetic interactions) is attached to flange cap 320 typically via a high temperature adhesive, although in alternatives, it may be attached via another mechanism, including but not limited to a fastener. Flange cap 320 includes a lip 321 that prevents the sleeve from sliding off of the flange cap. Additionally, gate 140 can be seen to fit into holes 360 via bent portions 370.

Figure 4:
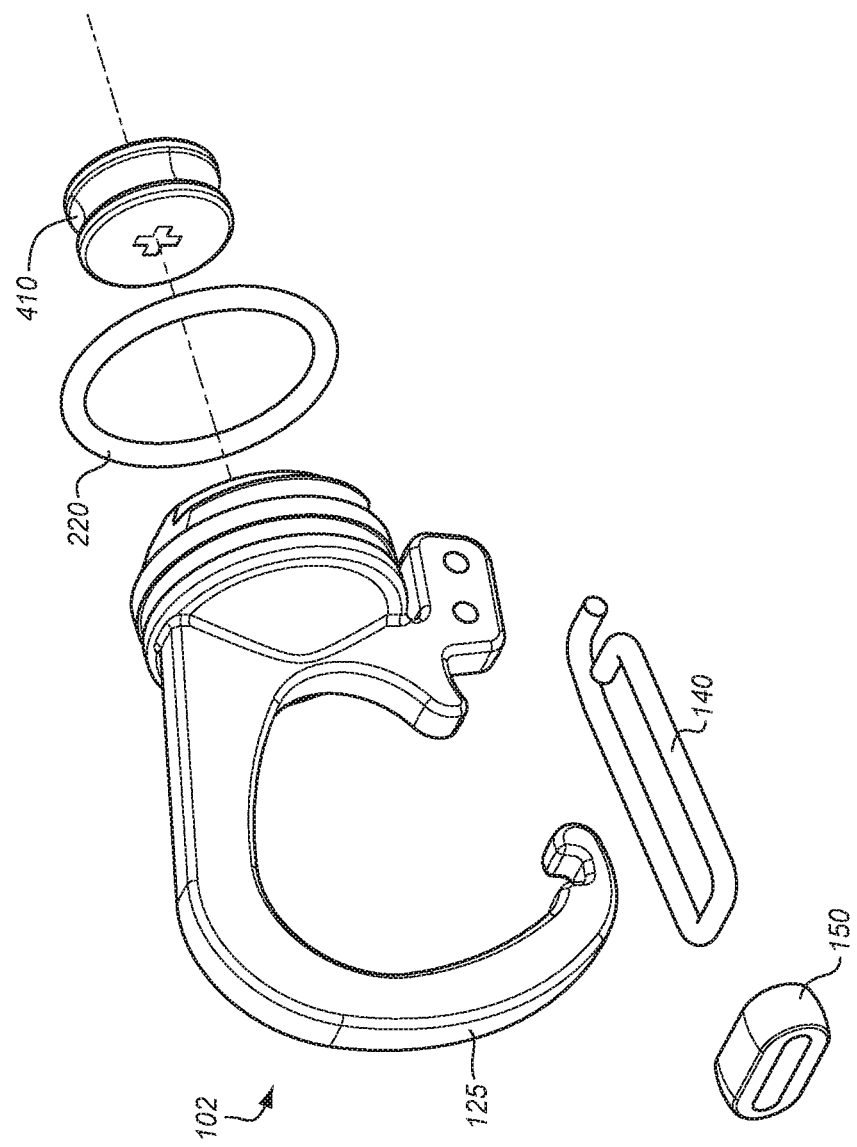
FIG. 4 shows an exploded view of another side of the carabiner portion of the 360 degree double carabiner of FIG. 1.
Figure 5:
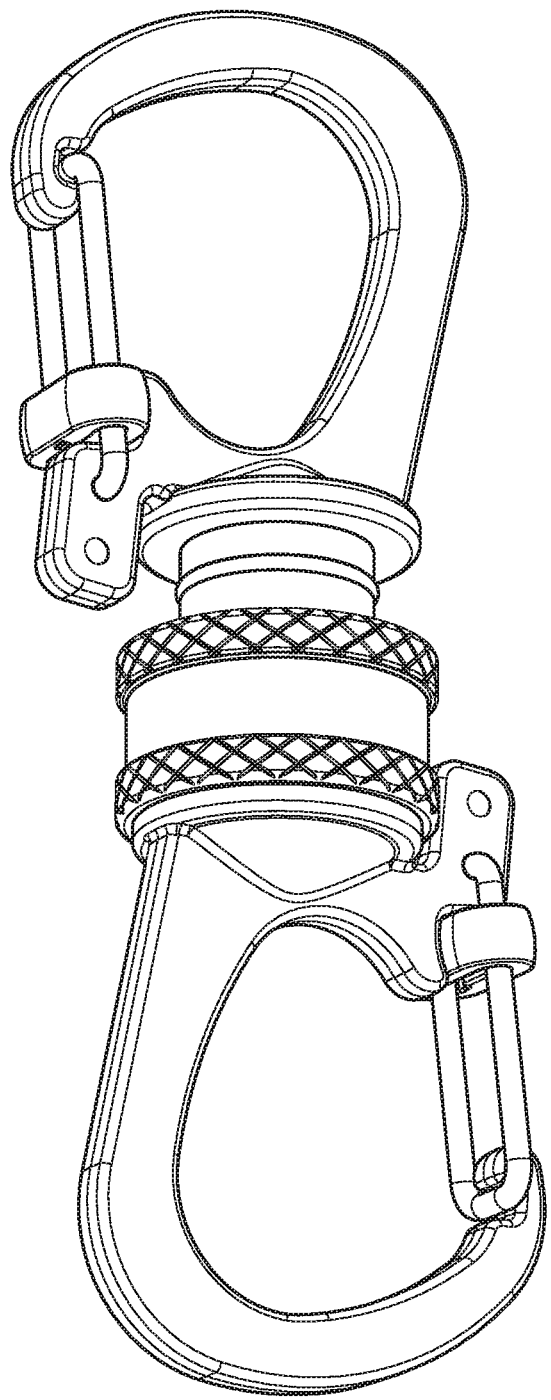
FIG. 5 shows a front perspective view of the 360 degree double carabiner of FIG. 1.
Figure 6:
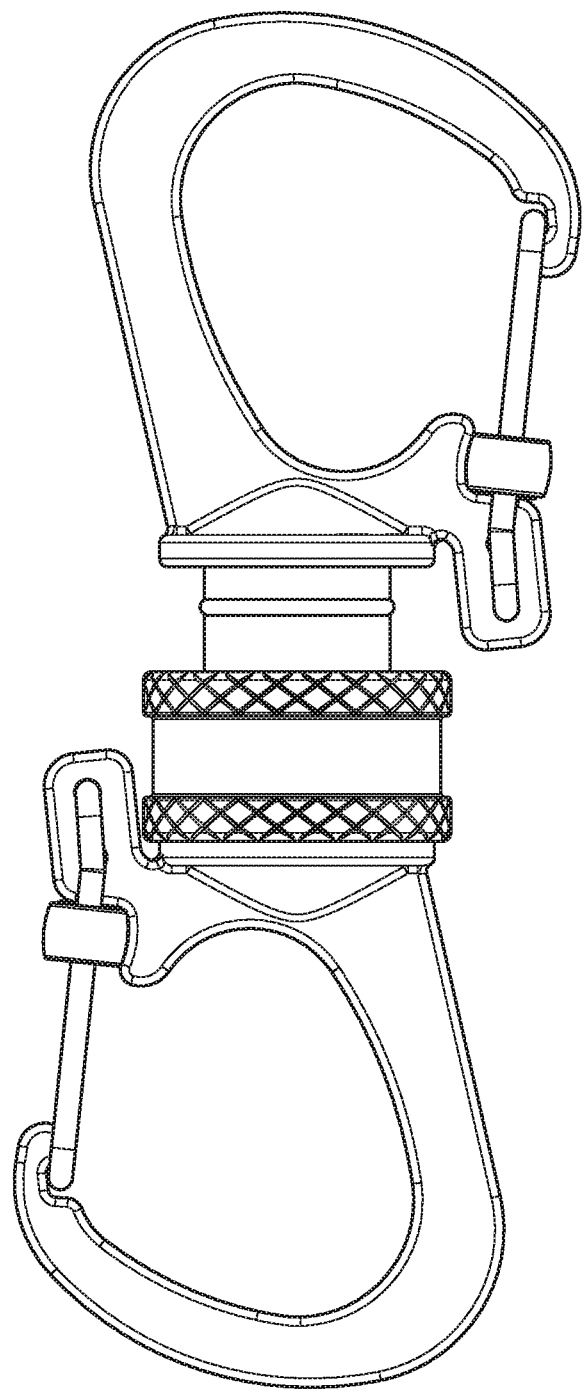
FIG. 6 shows a right side view of the 360 degree double carabiner of FIG. 1.
Figure 7:
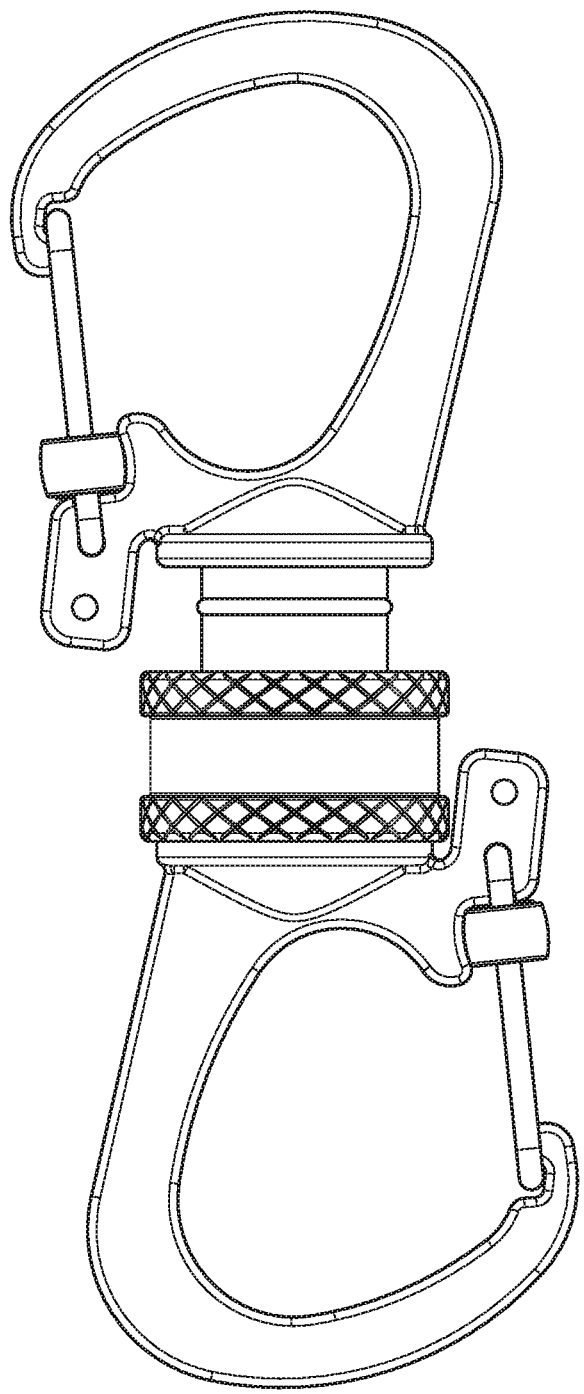
FIG. 7 shows a left side view of the 360 degree double carabiner of FIG. 1.
Figure 10:
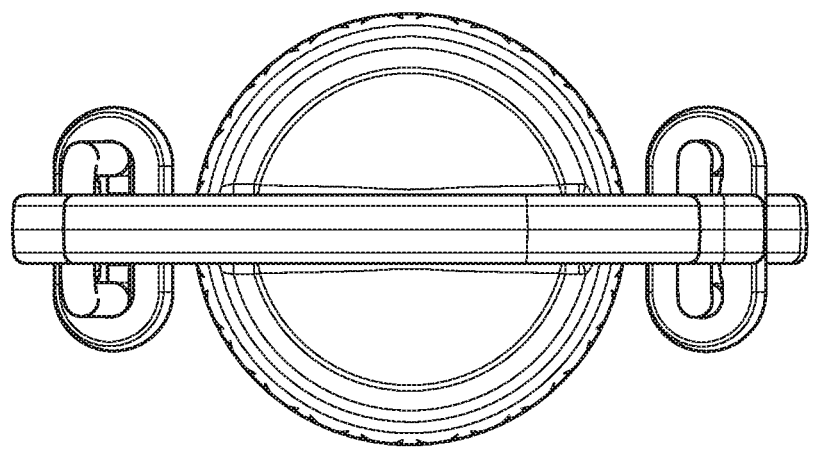
FIG. 10 shows a top view of the 360 degree double carabiner of FIG. 1.
Figure 11:
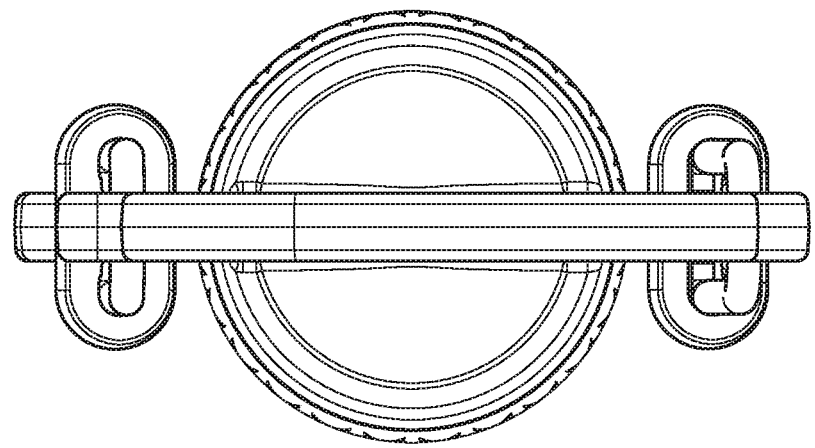
FIG. 11 shows a bottom view of the 360 degree double carabiner of FIG. 1.
Figure 12:
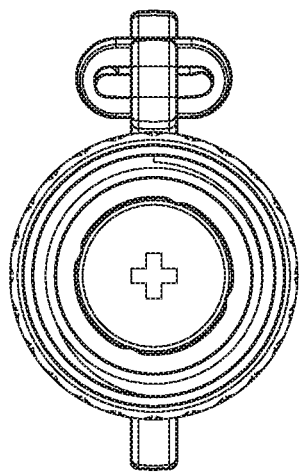
FIG. 12 shows a detached top bottom view of one side of the 360 degree double carabiner of FIG. 1.
Figure 13:
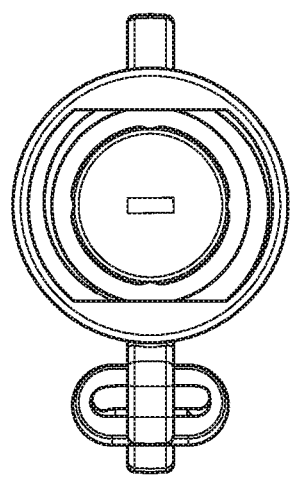
FIG. 13 shows a detached top bottom view of the other side of the 360 degree double carabiner of FIG. 1.

FIG. 4 shows an exploded view of carabiner portion 102. Visible in this view is carabiner portion 102. Carabiner portion 102 include a magnet 410 (or alternatively a magnetic material that is capable of magnetic interactions) is attached to an interior portion of carabiner portion 102 typically via a high temperature adhesive, although in alternatives, it may be attached via another mechanism, including but not limited to a fastener.

Since the carabiners may be rotated in relation to each other, the carabiners may be oriented such that it is convenient for the user to attach objects to both sides of the 360 degree double carabiner may easily be attached. Additionally, each carabiner may be attached and locked to an object. Then the sleeve may be used to join the two carabiners and affect the objects. The ability to orient the carabiners in position and to attach and detach the sleeve may be used in a variety of scenarios.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A carabiner apparatus comprising:
   a first carabiner;
   a second carabiner;
   a first attachment releasably securing the first and second carabiners together, the first attachment including a first piece of magnetic material attached to the first carabiner and a second piece of magnetic material attached to the second carabiner, the first piece of magnetic material and the second piece of magnetic material attracted to each other and releasably holding the first carabiner and the second carabiner together; and
   a second attachment releasably securing the first and second carabiners together, the second attachment including a locking member slidably connected to a portion of the first carabiner to move between first and second positions, wherein sliding movement of the locking member along the portion of the first carabiner to the first position at least partially engages the locking member with the second carabiner, and wherein sliding movement of the locking member along the portion of the first carabiner to the second position disengages the locking member from the second carabiner.

2. The apparatus of claim 1, wherein the locking member comprises a sleeve, the sleeve attached to the first carabiner and attachable to the second carabiner.

3. The apparatus of claim 2, further comprising a flange, the flange attached to the first carabiner, the sleeve surrounding and slidably connected to the flange, the sleeve rotatable around the flange.

4. The apparatus of claim 3, wherein the flange includes a lip, the lip limiting the sleeve from advancing off an end of the flange, the end of the flange projecting away from the first carabiner.

5. The apparatus of claim 4, wherein an inner portion of the sleeve is threaded and a corresponding outer portion of the second carabiner is complementarily threaded such that the sleeve is screwable onto the second carabiner, attaching the first carabiner and the second carabiner.

6. The apparatus of claim 5, further comprising a screw, the screw attaching the flange to the first carabiner.

7. The apparatus of claim 6, wherein the first piece of magnetic material is attached to the first carabiner via the flange and the first piece of magnetic material is attached to the flange.

8. The apparatus of claim 7, wherein the first and second carabiners are rotatable in relation to each other when the sleeve is screwed onto the second carabiner without unscrewing the sleeve.

9. The apparatus of claim 1, wherein the first and second carabiners each include a lockable carabiner.

10. The apparatus of claim 2, wherein the first and second carabiners include a lockable carabiner.

11. The apparatus of claim 5, further comprising an o-ring, the o-ring located on the second carabiner such that when the sleeve is screwed onto the second carabiner the o-ring is compressed, locking the sleeve in place.

12. The double carabiner of claim 1, wherein one of the first and second piece of magnetic material is a permanent magnet.

13. The apparatus of claim 9, wherein the lockable carabiner includes a gate with a slide on the gate, such that when the slide is positioned in a slot on the lockable carabiner, the gate is prevented from opening.

14. A double carabiner comprising:
   a first and second carabiner, a base of the first carabiner attachable to a base of the second carabiner;
   a first attachment releasably securing the base of the first carabiner to the base of the second carabiner, the first attachment including a first magnetic material located in the base of the first carabiner and a second magnetic material located in the base of the second carabiner, the first and second magnetic materials holding the first and second carabiners together; and
   a second attachment releasably securing the base of the first carabiner to the base of the second carabiner, the second attachment including a locking member slidably connected to the base of the first carabiner, wherein sliding movement of the locking member along the base of the first carabiner to a first position at least partially engages the locking member with the second member, and wherein sliding movement of the locking member along the base of the first carabiner to a second position disengages the locking member from the second carabiner.

15. The double carabiner of claim 14, wherein the locking member comprises a sleeve, the sleeve slidably connected to the base of the first carabiner and attachable to the base of the second carabiner.

16. The double carabiner of claim 15, wherein the sleeve is connectable to the base of the second carabiner via a threading in the base of the second carabiner and a threading in the sleeve.

17. The double carabiner of claim 16, wherein the first and second carabiner are rotatable in relation to each other when the sleeve is screwed to the second carabiner.

18. The double carabiner of claim 17, wherein the first and second magnetic material hold the first and second carabiner in a rotational position.

19. The double carabiner of claim 18, wherein one of the first and second magnetic material is a permanent magnet.

20. The double carabiner of claim 18, wherein the first and second carabiner are locking carabiners.

21. A carabiner apparatus comprising:
   a first carabiner;
   a second carabiner;
   a first attachment releasably securing the first and second carabiners together, the first attachment including a first magnetic material attached to the first carabiner and a second magnetic material attached to the second carabiner, the first and second magnetic materials releasably holding the first and second carabiners together; and
   a second attachment releasably securing the first and second carabiners together, the second attachment including a sleeve of the first carabiner in threading engagement with a portion of the second carabiner, the sleeve slidably connected to a portion of the first carabiner to move between first and second positions, wherein sliding movement of the sleeve along the portion of the first carabiner to the first position positions the sleeve for threading engagement with the second carabiner, and wherein sliding movement of the sleeve along the portion of the first carabiner to the second position disengages the sleeve from the second carabiner.

* * * * *